United States Patent
Hollister

(10) Patent No.: US 11,670,190 B1
(45) Date of Patent: Jun. 6, 2023

(54) TRAINING APPARATUS USING AUGMENTED AND VIRTUAL REALITY

(71) Applicant: ARCHITECTURE TECHNOLOGY CORPORATION, Eden Prairie, MN (US)

(72) Inventor: Dahyun Hollister, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 434 days.

(21) Appl. No.: 16/780,582

(22) Filed: Feb. 3, 2020

(51) Int. Cl.
 *G06V 20/20* (2022.01)
 *G09B 19/00* (2006.01)
 *G09B 9/00* (2006.01)

(52) U.S. Cl.
 CPC ........... *G09B 19/003* (2013.01); *G06V 20/20* (2022.01); *G09B 9/003* (2013.01)

(58) Field of Classification Search
 CPC ..................................................... G06F 21/32
 See application file for complete search history.

(56) References Cited

U.S. PATENT DOCUMENTS

| | | | |
|---|---|---|---|
| 7,350,192 B2 | 3/2008 | Seitz et al. | |
| 10,324,712 B1 | 6/2019 | Nolan | |
| 11,042,369 B1 | 6/2021 | Kimball et al. | |
| 2007/0157178 A1 | 7/2007 | Kogan et al. | |
| 2008/0022266 A1 | 1/2008 | Hudson | |
| 2013/0174118 A1 | 7/2013 | Ziegler | |
| 2014/0282373 A1 | 9/2014 | Garza | |
| 2014/0282456 A1 | 9/2014 | Drost et al. | |
| 2014/0331202 A1 | 11/2014 | Fukuda et al. | |
| 2015/0082276 A1 | 3/2015 | Balachandran | |
| 2015/0234736 A1 | 8/2015 | Koju et al. | |
| 2016/0063107 A1 | 3/2016 | Schukovets et al. | |
| 2017/0242772 A1 | 8/2017 | Liu et al. | |
| 2017/0262567 A1 | 9/2017 | Vassiliev | |
| 2017/0315803 A1 | 11/2017 | Ghouti et al. | |
| 2018/0161678 A1* | 6/2018 | Snow | A63F 13/822 |
| 2018/0255335 A1* | 9/2018 | George | H04N 21/8541 |
| 2019/0317760 A1 | 10/2019 | Kessentini et al. | |
| 2020/0074266 A1* | 3/2020 | Peake | G06V 10/774 |
| 2020/0082735 A1* | 3/2020 | Nel | G09B 19/00 |
| 2020/0093291 A1 | 3/2020 | Liu | |

(Continued)

OTHER PUBLICATIONS

"IT Glossary (/it-glossary/)," retrieved from https://www.gartner.com/it-glossary/legacy-application-or-system/ on Dec. 1, 2017, 2018.

(Continued)

*Primary Examiner* — Di Xiao
(74) *Attorney, Agent, or Firm* — Foley & Lardner LLP

(57) ABSTRACT

Various embodiments described herein relate to a server-based virtual training environment monitor, which may configure and customize an exercise and fitness program accessible through augmented and virtual reality applications running on an electronic device of a user, based on a current state and events associated with the user. The current state and events are determined through reactive agents (for example, intelligent agents) and monitoring devices (for example, sensors), which are directly or indirectly associated with the electronic device.

20 Claims, 2 Drawing Sheets

(56) References Cited

U.S. PATENT DOCUMENTS

| | | | | |
|---|---|---|---|---|
| 2020/0110461 | A1* | 4/2020 | Trim | H04N 21/25891 |
| 2020/0279205 | A1* | 9/2020 | Gong | G06K 9/6267 |
| 2020/0293291 | A1 | 9/2020 | Guan | |
| 2020/0334908 | A1* | 10/2020 | Wilson | G02B 27/0172 |
| 2020/0357299 | A1* | 11/2020 | Patel | A61B 5/11 |
| 2022/0008745 | A1* | 1/2022 | Kirchner | G16H 50/20 |

OTHER PUBLICATIONS

Anderson, "Embedded Medical Device Software—How and Why to Use Static Analysis to Update Legacy Code," Embedded Systems Engineering, May 2015.
Fowler, "Workflows of Refactoring," martinfowler.com, Jan. 8, 2014.
Fratini et al., "A Service Oriented Approach for the Interoperability of Space Mission Planning Systems," 4$^{th}$ Workshop on Knowledge Engineering for Planning and Scheduling, KEPS-2013, Jun. 2013.
Hoffman, "Air Force Awards Leidos $350M Joint Mission Planning System Integration IDIQ," govconwire.com, Dec. 9, 2016.
Keller, "Navy Picks Nine Companies to Write and Maintain Software for Important Battle-Management Systems," militaryaerospace.com, Mar. 6, 2015.
Lecun et al., "How do you Teach a Machine?" The Wall Street Journal, Jun. 14, 2016.
Murphy-Hill, "The Past, Present, and Future of Refactoring," computers.org, Dec. 2015.
Vecchio et al., "Digital Demand in the Banking Industry and the Impact on Legacy Systems," gartner.com, Jun. 15, 2016.
Zhang et al, "Migrating Legacy Applications to the Service Cloud," Conference Paper, OOPSLA 2009, Oct. 2009, pp. 59-67.
"IT Glossary (/it-glossary/)," retrieved from https://www.gartner.com/it-glossary/legacy-application-or-system/ on Dec. 1, 2017, 2018, 3 pages.
Anderson, "Embedded Medical Device Software—How and Why to Use Static Analysis to Update Legacy Code," Embedded Systems Engineering, May 2015, 6 pages.
Fowler, "Workflows or Refactoring," martinfowler.com, Jan. 8, 2014, 1 page.
Fratini et al., "A Service Oriented Approach for the Interoperability of Space Mission Planning Systems," 4th Workshop on Knowledge Engineering for Planning and Scheduling, KEPS-2013, Jun. 2013, 6 pages.
Hoffman, "Air Force Awards Leidos $350M Joint Mission Planning System Integration IDIQ," govconwire.com, Dec. 9, 2016, 1 page.
Keller, "Navy Picks Nine Companies to Write and Maintain Software for Important Battle-Management Systems," militaryaerospace.com, Mar. 6, 2015, 7 pages.
Murphy-Hill, "The Past, Present, and Future of Refactoring," computers.org, Dec. 2015, 6 pages.
Vecchio et al., "Digital Demand in the Banking Industry and the Impact on Legacy Systems," gartner.com, Jun. 15, 2016, 3 pages.
Dahyun Hollister, Phase I SBIR Proposal, "Virtual Training Environment Monitor," Topic Number and Name: A19-013, Feb. 6, 2019, 24 pages.

* cited by examiner

TRAINING APPARATUS USING AUGMENTED AND VIRTUAL REALITY

TECHNICAL FIELD

This application relates generally to a field of training apparatus, and more specifically, this application relates to an interactive training apparatus using augmented and virtual reality.

BACKGROUND

Various programs may be employed to train users. Conventional computer-based training systems may rely on one-size-fits-all programs where tasks are to be performed by each user. These program may utilize online materials, videos, games, simulations, and more. Regardless of their form, these programs usually follow a fixed pattern where a predefined sequence of tasks is prescribed for groups of users, whereby each user follows the same sequence regardless of performance. These conventional techniques fail to customize the training programs for each user, thereby reducing their effectiveness.

SUMMARY

For the aforementioned reasons, what is therefore desired is a computer-based training apparatus configured to execute an interactive training application, which may provide customized and tailored program for each user using augmented reality and/or virtual reality, based on a current state or condition of each user. There is a desire for an intelligent computer-implemented methods and systems to dynamically (and sometimes in real time) modify the training program.

In one embodiment, a server-implemented method may include presenting, by a server for a headset display associated with an electronic device, a plurality of first virtual interactive objects corresponding to a first task from a first digital content file on a graphical user interface representing a first virtual environment; processing, by the server from a software agent executing on the electronic device communicating with at least one sensor, biometric information associated with the user while the user is performing the first task to determine a current state of the user; determining, by the server from the software agent executing on the electronic device communicating with at least one controller, an occurrence of an event within the first virtual environment based on performance of the first task; in response to the occurrence of the event within the first virtual environment and a value of the biometric information, dynamically generating, by the software agent executed by the electronic device, a second virtual environment by dynamically selecting a set of second virtual interactive objects of a second digital content file on the graphical user interface of the headset display associated with the electronic device, the selected set of second virtual interactive objects corresponding to a second task subsequent to the first task and dependent upon the occurrence of the event and the value of the biometric information; and training, by the server, the software agent using the selected set of second virtual interactive objects, the occurrence of the event and biometric information for future selections of second virtual interactive objects.

In another embodiment, a system include a non-transitory storage medium configured to store a plurality of computer program instructions and a server electrically coupled to the non-transitory storage medium. The server may be configured to present for a headset display associated with an electronic device, a plurality of first virtual interactive objects corresponding to a first task from a first digital content file on a graphical user interface representing a first virtual environment; process from a software agent executing on the electronic device communicating with at least one sensor, biometric information associated with the user while the user is performing the first task to determine a current state of the user; determine from the software agent executing on the electronic device communicating with at least one controller, an occurrence of an event within the first virtual environment based on performance of the first task; in response to the occurrence of the event within the first virtual environment and a value of the biometric information, dynamically generate by the software agent executed by the electronic device, a second virtual environment by dynamically selecting a set of second virtual interactive objects of a second digital content file on the graphical user interface of the headset display associated with the electronic device, the selected set of second virtual interactive objects corresponding to a second task subsequent to the first task and dependent upon the occurrence of the event and the value of the biometric information; and train the software agent using the selected set of second virtual interactive objects, the occurrence of the event and biometric information for future selections of second virtual interactive objects.

BRIEF DESCRIPTION OF THE DRAWINGS

Non-limiting embodiments of present disclosure are described by way of example with reference to accompanying figures, which are schematic and are not intended to be drawn to scale. Unless indicated as representing background art, the figures represent aspects of the present disclosure.

DETAILED DESCRIPTION

Figure 1:
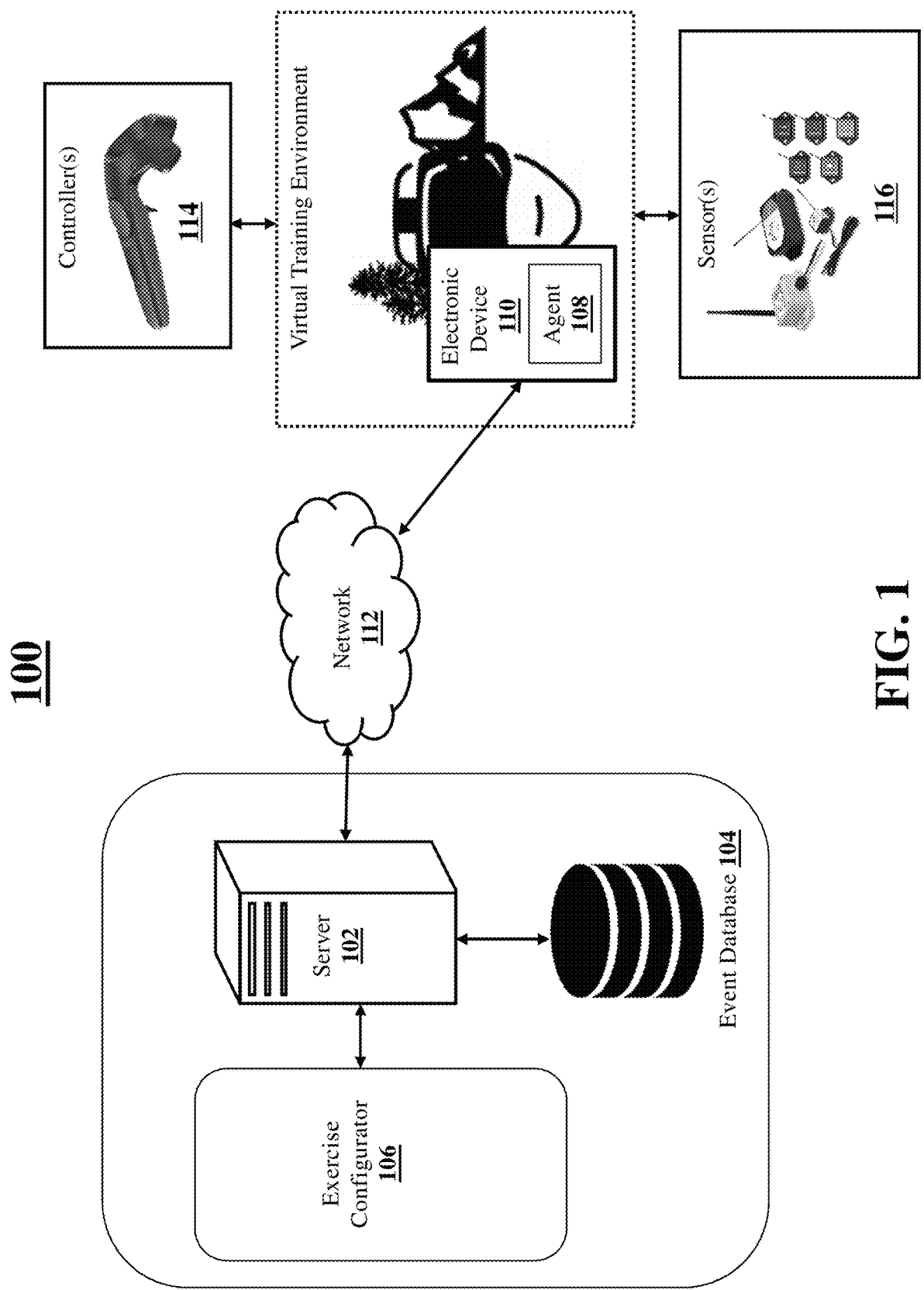
FIG. 1 shows components of a computer-based training system, according to an embodiment.

The present disclosure is here described in detail with reference to embodiments illustrated in the drawings, which form a part here. Other embodiments may be used and/or other changes may be made without departing from the spirit or scope of the present disclosure. The embodiments described in the detailed description are not meant to be limiting of the subject matter presented here. Reference will now be made to the embodiments illustrated in the drawings, and specific language will be used herein to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein.

Computer-based training program (for example, a virtual reality based training program or an augmented reality based training program) may be used by users (for example, military officers), and many other professionals, which may require hands-on training experience. To increase the effectiveness of the computer-based training program for each user (for example, trainee), a training program may be dynamically customized for each user in real time based on a current state or condition of each user. The current state may include a current physical state of each user while executing tasks associated with the computer-based training program.

A server-based virtual training environment monitor may assist to configure and customize a training program accessible through augmented and virtual reality applications for each user, based on their current state and events, which are determined through reactive agents (for example, intelligent agents) and monitoring devices (for example, electronic devices, sensors, cameras, and exercise equipment such as hand-held controllers). By simplifying program configuration steps and enabling real time dynamic customization of the training program for each user, the server-based virtual training environment monitor may reduce time and resources for administrators (for example, trainers) to create the customized training program for each user to increase the effectiveness of the computer-based fitness program. The server-based virtual training environment monitor may benefit any organization, which may need to train their users in hands-on experience field that's tailored to each user.

The server-based virtual training environment monitor may include a unique and valuable customization interface. The server-based virtual training environment monitor may include agents, such as software agents, which monitors a user's state, provide a reaction based on their state, or save the state for further review. For example, in a virtual training environment, the user is executing tasks (for example, various exercises, games, drills, missions, or other simulation tasks) associated with the training program. If the user reaches a particular target point (for example, complete a first level), the agent may react and trigger a next specific task in a sequence of tasks within the training program, such as an enemy team moving into a position, and will record corresponding training routine status data for developing future tasks, feeding into a machine-learning process, or providing to instructors and researchers for later assess.

The server-based virtual training environment monitor may be an innovative and intuitive device, which may customize the training program of each user accessible through augmented and/or virtual reality applications by reacting to each user current state or condition. The server-based virtual training environment monitor may include reactive agents and monitoring devices, which are configured to monitor each user state or condition when the user is executing the tasks associated with the training program, and trigger a subsequent action (for example, generate a new virtual scenario within ongoing tasks or present a new task comprising new virtual interactive objects) based on determined state or condition of each user.

The server-based virtual training environment monitor may include a reactive monitoring device and deployable agents. The agents may be configurable software agents, which may be deployed in a virtual training environment regardless of where the virtual training environment is running. The server-based virtual training environment monitor may observe the training program of each user that is running in a separate physical hardware (for example, a virtual reality headset or an augmented reality headset associated with a hand-held controller) as long as the physical hardware is connected through a network by deploying the agents. The agents may also run on a same hardware (for example, a server, an electronic device associated with the user, the virtual reality headset, the augmented reality headset, or the hand-held controller) as the training program. Such an arrangement may provide a flexibility for each task within the training program to have many different monitoring devices. When performing team tasks, the server-based virtual training environment monitor may set up individual monitoring devices (for example, sensors and cameras) and deploy agents to multiple hardware platforms (for example, electronic devices, virtual/augmented reality headsets, and controllers) that are locally running the training program to monitor the state or condition of each user at a same time. The agents may be capable of monitoring certain events or states of the users while the user is performing the tasks and reporting back valuable status information to the monitoring devices. The server-based virtual training environment monitor may be capable of filtering the status information received from the agents and instructing the agents to react when targeted information is received (for example, the user may have completed a particular stage or level of the task in the training program). The server-based virtual training environment monitor may not just monitor one event (for example, when a particular task is completed by the user) to trigger a reaction from the agents, but may also trigger the agents based on several different states and events (for example, when the user may complete a particular task and reach a particular body temperature level (or other biometric threshold)).

The server-based virtual training environment monitor may include a configurator. The agents monitor the events or states associated with each user while the user is executing the training program, and the configurator configures the reactions of the agents that perform based on the events/states. The configurator may be a drag-and-drop interface, which may include fill-in-the-blank configurations. Trainers and instructors may use the interface to create the training program, which may include a set of tasks (for example, games, feats, or missions) that are accessible via the augmented and/or virtual reality applications. A configuration of each training program may be saved and accessed by the server-based virtual training environment monitor during the execution of the training program in order to dynamically customize the tasks within the training program in real time. The configurator may have an ability to display user progress to researchers and trainers while executing the training program in real time or to review the previously run exercises by any user at any time.

At a start of each task within the training program, the server-based virtual training environment monitor may execute and enable the agents based on each configuration created using the configurator and may send the agents to an appropriate target. The target may be a hardware sensor, which the user may be wearing or present in the training environment itself. Once the agents are deployed, the server-based virtual training environment monitor may enable a connection with the deployed agents and start receiving status information from the agents. During this process, the server-based virtual training environment monitor not only sorts through received status information but may also save the received status information in a database. Based on the analysis of the received status information, when the server-based virtual training environment monitor determines that the user has triggered a certain event (for example, completed a first task or a first level of a particular task) or is in a certain state (for example, reached a particular physiological level or biometric threshold), the server-based virtual training environment monitor transmits an instruction and/or a signal to the agents ordering the agents to perform an action (for example, add a new task comprising new virtual interactive objects or generate a new virtual scenario within the current task). Through the use of the agents, the server-based virtual training environment monitor may enable quick dynamic customization of individual tasks within the training program based on the user's current state and events without requiring trainers and researchers to possess extensive specialized knowledge of computer programming.

FIG. 1 shows an example of a computer-based exercise training system 100. The computer-based training system 100 may include a server 102, an event database 104, an configurator 106, an agent 108 (for example, a software agent), and an electronic device 110. The computer-based training system 100 may further include at least one controller 114 (for example, a hand-held controller) and at least one sensor 116 (for example, a biometric sensor). The server 102, the event database 104, the configurator 106, the agent 108, the electronic device 110, the at least one controller 114, and the at least one sensor 116 may be connected to each other and communicate via a network 112. The network 112 may include, but is not limited to, private or public local area network, wireless local area network, metropolitan area network, wide-area network, and the Internet. The network 112 may further include both wired and wireless communications, according to one or more standards, via one or more transport mediums. The communication over the network 112 may be performed in accordance with various communication protocols, such as, transmission control protocol and internet protocol, user datagram protocol, and institute of electrical and electronics engineers communication protocols. The network 112 may further include wireless communications, according to Bluetooth specification sets, or another standard or proprietary wireless communication protocol. The network 112 may further include communications over a cellular network, including, for example, a global system for mobile communications, code division multiple access, and enhanced data for global evolution network.

The computer-based exercise training system 100 is described in a context of computer-executable instructions, such as program modules, being executed by server computers, such as the server 102. The server 102 may operate various software programs and algorithms, such as the agent 108. A machine-learning model, which may be hosted by the server 102 or the agent 108, is used to train the agent 108 to better dynamically determine an appropriate task and dynamically select virtual interactive objects within a digital content file corresponding to the task (for example, a combat simulation game or a drill), then cause presentation of the virtual interactive objects on the electronic device 110. The agent 108 may include a set of programs, objects, components, data structures, etc., which may perform particular jobs, such as dynamically configuring and dynamically customizing a training program (for example, the training program may include the virtual interactive objects corresponding to the task representing a virtual environment) in real time for each user that may be accessible via augmented and virtual reality applications. The features of the computer-based exercise training system 100 may be practiced either in a single computing device, or in a distributed computing environment, where various jobs may be performed by processing devices, which may be linked through the network 112. In the distributed computing environment, the various program modules may be located in both local and remote computer storage media including memory storage devices.

The computer-based training system 100 may operate in a local computing environment where the server 102 may generate and execute various jobs using the configurator 106 and the agent 108. A job may be associated with generating a graphical user interface presenting a first training program that includes first virtual interactive objects corresponding to a first task in a first virtual environment for each user that may be accessible to each user via augmented and virtual reality applications executed on the electronic device 110 and displayed on an augmented or virtual reality headset display. Another job may be associated with dynamically updating the first training program (for example, the first program may be updated to a second training program, which may include second virtual interactive objects corresponding to a second task representing a second virtual environment) for each user in real time based on a current state and/or a condition of each user while each user is executing the first task (for example, games, missions, and drills) associated with the first training program. The event database 104 and application programs associated with the agent 108 managed by the server 102 may be stored and executed on local computing resources, such as electronic device 110.

The computer-based exercise training system 100 may operate in a cloud-computing environment where the server 102 may be cloud-optimized. The server 102 may generate and execute the jobs using the configurator 106 and the agent 108. The event database 104, the electronic device 110 data and software programs (for example, the augmented or virtual reality applications), and the application programs associated with the agent 108 (including the machine-learning model) may be stored and executed on a remote cloud-based server 102 accessed over a network cloud.

The electronic device 110 is a computing device including a processing unit. The processing unit may include a processor with a computer-readable medium, such as a random access memory coupled to the processor. The electronic device 110 may be running algorithms or computer executable program instructions, which may be executed by a single processor or multiple processors in a distributed configuration. The electronic device 110 may interact with one or more software modules of a same or a different type operating within the computer-based training system 100.

Non-limiting examples of the processor may include, but not limited to, a microprocessor, an application specific integrated circuit, a field programmable object array, among others. The processor may include a graphics processing unit specialized for rendering and generating computer-generated graphics. Non-limiting examples of the electronic device 110 may include, but are not limited to, a virtual reality device, an augmented reality device, a cellular phone, a mobile phone, a tablet computer, a head-mounted display, wearable computer glasses, a personal data assistant, or a personal computer (e.g., laptop).

The electronic device 110 displays the graphical user interface representing the virtual environment on an associated headset display, such as glasses, goggles, or other display communicating with the electronic device 110. However, it should be appreciated that some embodiments may include a different electronic device 110 capable of performing various augmented or virtual reality tasks. For example, the electronic device 110 may be a display device in form of goggles, or any other structure that supports and incorporates various components of the electronic device 110, as well as serves as a conduit for electrical connections.

The electronic device 110 may be communicatively coupled to processors, transmitters, receivers, display screens, sensor devices, cameras, and input devices, which may be housed in or separate from the electronic device 110, whether in a wired or wireless configuration. The sensor devices may be MEMS sensors, such as accelerometers, global positioning system, and solid state compass, making the sensor devices suitable for augmented and virtual reality platforms.

The electronic device 110 may include an agent 108 (for example, an intelligent agent) that may communicate with the sensors 116, the camera, and other components (for example, the controller 114) directly or indirectly associated with the electronic device 110. The intelligent agent may be a computer program. The algorithm executed by the intelligent agent is trained by a machine learning component. The intelligent agent may exhibit characteristics of artificial intelligence, such as reasoning. The intelligent agent is continuously or periodically trained using a trained dataset to observe and monitor behavior and actions of the user, report back to the server 102 when a predetermined event may occur, and dynamically generate a new virtual environment based on the predetermined event and/or biometric condition.

The electronic device 110 may include an operating system for managing various resources of the electronic device 110. An application-programming interface associated with the operating system may allow various application programs, such as media streaming application programs to access various services offered by the computer-based training system 100.

The electronic device 110 may include input and output devices. In addition to the display presenting the graphical user interface used for the augmented or virtual reality environment, the electronic device 110 may also include a display (e.g., mobile phone touchscreen display). The input and output devices may allow the user to interact with various programs and computer software applications, such as a media streaming application configured to communicate with the server 102 to view a digital content file or objects from the digital content file on the electronic device 110. The media streaming application may be an augmented reality application or a virtual reality application configured to allow presentation of the virtual environment on a display (e.g., headset display) of the user.

The electronic device 110 may include a user-side media streaming application. The user may interact with the media streaming application to receive the digital content file from the event database 104 based on one or more attributes (for example, a training goal or a physiological profile) associated with the user. A processor of the electronic device 110 executes computer-readable instructions of the digital content file to present a virtual environment for a training program. The training program may include a plurality of virtual interactive objects corresponding to a plurality of tasks (for example, combat games and chemical plant tour games). In one example, a first digital content file includes computer-readable instructions configured to execute a first training program including a plurality of first virtual interactive objects (for example, cars, buses, apartments, and humans) corresponding to a plurality of first tasks (for example, combat games in cities) representing a first virtual environment. In another example, a second digital content file includes computer-readable instructions configured to execute a second training program including a plurality of second virtual interactive objects (for example, plants, mountains, humans, animals, or other environmental features) corresponding to a plurality of second tasks (for example, combat games in mountains) representing a second virtual environment.

The electronic device 110 may include the media streaming application, which may be a software stack running on the operating system of the electronic device 110. The media streaming application may have a protocol layer and a user interface layer where each layer may be responsible for specific jobs and functions. The protocol layer may communicate with the operating system, and may manage various connections of the electronic device 110 over the network 112. The protocol layer may communicate with the user interface layer. The protocol layer may control the user interface layer to present the digital content file to the user via an application interface of the media streaming application, and to receive information from the user via the application interface.

The electronic device 110 may include a web browser. The electronic device 110 may execute the web browser to access and present a media streaming web application. The electronic device 110 may execute the media streaming web application to access the digital content file from the database, such as the event database 104. The user may view and play the digital content file via a web interface of the media streaming web application.

In order to access the media streaming application on the electronic device 110, the electronic device 110 may transmit media streaming application credentials of the user via user inputs to the server 102, from which the server 102 may validate the user. The electronic device 110 may include a number of input devices (e.g., a touchscreen, controller) to receive the user inputs, including various types of credentials and data inputs allowing for validation, e.g., username, passwords, certificates, biometrics. When the server 102 may validate the user, the user may have access to the features of the media streaming application.

The electronic device 110 operated by the user may generate and transmit a request to the server 102 via the media streaming application to access and view the digital content file. The request may include an objective (for example, the training goal) of the user. The training goal may include a survival training program, a rescue operation training program, or a combat training program. The request may further include profile data of the user. The profile data may include past training goals, past tasks, task results, physiological data etc. of the user. In response to the request, the electronic device 110 may receive the digital content file. The digital content file may include the training program, which may include a plurality of virtual interactive objects corresponding to one or more tasks representing a virtual environment.

The electronic device 110 may be associated with the controller 114, such as a hand-held controller. The electronic device 110 operated by the user may generate and transmit the request to the server 102 via the controller 114 to access and view the digital content file. In response to the request, the electronic device 110 may receive the digital content file. The digital content file for the training program includes the plurality of virtual interactive objects corresponding to the one or more tasks representing the virtual environment. The user may use the controller 114 along with the electronic device 110 to execute the one or more tasks.

The electronic device 110 may include a transmitter and a receiver. The transmitter may transmit or broadcast signals to the receiver. One or more monitoring devices associated with the electronic device 110 captures the signals while the user is executing the tasks associated with the training program using the controller 114. The signals may include, but are not limited to, voice signals of the user, eye movement and retinal signals of the user, body heat signals of the user, and/or heart rate signals of the user. The transmitter and the receiver may be permanently integrated into the electronic device 110, which may result in a single integrated product or unit. The transmitter and the receiver may be detachably coupled to the electronic device 110. For instance, the electronic device 110 may be placed into a protective sleeve containing embedded transmitter and receiver that are detachably coupled to the electronic device 110 power supply input.

The electronic device 110 is communicatively coupled to at least one camera. The at least one camera can perform different functions. The camera may be used as a sensor, such as for motion tracking. An outward-facing camera mounted on or integrated into the headset display may be used to determine the direction that the user is facing. The camera can be used to track depth or perform pattern recognition. The camera tracks the movement in any direction by detecting the direction of the camera. In a virtual reality (VR) configuration, the graphical user interface on the display may present a fully immersive simulated environment that allows the user to interact and can optionally provide feedback (e.g., auditory, video, haptic feedback) to the user. In an augmented reality (AR) configuration, the electronic device enhances a real-world view with computer-generated images and information. The augmented reality configuration also allows the user to interact and can optionally provide feedback (e.g., auditory, video, haptic feedback) to the user. In either configuration, the camera functions to present that environment to the user.

The electronic device 110 may use the camera to capture images of the environment while the user is performing a task during execution of the digital content file. In one configuration, the user operates the controller 114 to command the camera to capture the images. The electronic device 110 may transmit the images to the server 102 via the agent 108. The agent 108 may automatically collect the images from the camera, and transmit the images to the server 102. The images of the user may be processed to evaluate the user.

The electronic device 110 is communicatively coupled (wired or wireles sly) to the monitoring device, such as the sensor 116. In another embodiment, the sensor 116 may be coupled to the controller 114. In yet another embodiment, the sensor 116 may be couple to a wearable device, such as a watch used by the user. The sensor 116 may determine and record biometric information of the user when the user is executing the tasks associated with the training program using the electronic device 110 and/or the controller 114. The sensor 116 may further determine and record a location of the user when the user is executing the tasks associated with the training program using the electronic device 110 and/or the controller 114. The sensor 116 may further detect and record eye movement positions of the user with respect to the graphical user interface of the electronic device 110 when the user is executing the tasks associated with the training program using the electronic device 110 and/or the controller 114.

The sensor 116 generates sensor data associated with the user when the user is executing the tasks associated with the training program using the electronic device 110 and/or the controller 114. Non-limiting examples of the sensor data may include biometric data of the user, physiological state data of the user, voice data of the user, body temperature data of the user, heart rate data of the user, motivational state data of the user, proficiency data of the user, and eye movement data of the user. The biometric data of the user may include body measurements and calculations. The heart rate data of the user may include a number of heart beats of the user in a predetermined amount of time. The body temperature data of the user may include current body temperature of the user. The voice data of the user may include a recording of a voice of the user. The eye movement data of the user may include the list of the virtual interactive objects associated with the tasks, which may have had prolonged fixations (dwell times) from the eyes of the user while the eyes of the user was moving over different virtual interactive objects. The sensor 116 may store the sensor data in a local memory of the electronic device 110. The sensor 116 may store the sensor data in the event database 104.

The electronic device 110 may transmit the sensor data and other data (for example, the camera data) to the server 102 via the agent 108 for subsequent processing. The agent 108 may automatically collect the sensor data from the sensor 116 and transmit the sensor data to the server 102. The server 102 from the agent 108 may process the sensor data and other data to determine the current state and condition of the user. Based on the current state and condition of the user, the server 102 from the agent 108 may determine various modes of operations. These operations may include selecting a new digital content file (for example, a new training program) for display on the electronic device 110 or dynamically updating objects within the virtual environment of the current training program being displayed on the electronic device 110. The new digital content file may include a new training program, which may include a plurality of new virtual interactive objects corresponding to a new task representing a new virtual environment.

The sensor 116 may be a passive sensor, an active sensor, or a smart sensor. The different types of sensors may be categorized by sensor type, characteristic hardware, and software requirements. The passive sensor may be used as a secondary sensor that may be dispersed into a communication field of the electronic device 110 and may be part of the receiver of the electronic device 110 or otherwise independently capture the sensor data associated with the user that may be wirelessly communicated to the sensor processor. The active sensor may have minimal processing associated with the sensor data produced. The smart sensor may have an on-board digital signal processing for primary sensor data (e.g., prior to processing by a processor of the electronic device 110 or the server 102).

The electronic device 110 includes a display screen that presents the virtual environment for that training program via a graphical user interface of the media streaming application. The display screen may be a light emitting display for presentation of content (for example, tasks) of the training program in an interactive and a visual form. The display screen may be configured in a head-mounted display system for optically presenting the content of the exercise and fitness program into the eyes of the user through a virtual retinal display. The display screen may include one or more of display components such as a cathode ray tube, a liquid crystal display, an OLED display, an AMOLED display, a super-AMOLED display, a plasma display, an incandescent light, a fluorescent light, a front or rear projection display, or a light emitting diode indicator. The display screen may further include an imaging system, which can be implemented with a number of micro display panels, lenses, and reflecting elements to display and project images and objects within the digital content file. The display panels, lenses, and/or reflecting elements of the imaging system can be implemented with display technologies, such as implemented with a transparent LCD, or using a projection technology. The projection technology may be implemented using LCD type displays with powerful backlights and high optical energy densities. Alternatively, a micro display and/or reflecting element may be implemented using a reflective technology, such as digital light processing and liquid crystal on silicon that reflects external light, which is reflected and modulated by an optical material.

In addition to the display screen used to present the virtual environment, the electronic device 110 may include a display screen for entering data and commands (for example, a request to receive the training program) in the form of text, touch input, gestures, etc. The display screen may be a touch screen device, keypad, mouse, stylus, or a proximity detector, a sensor, or any input/output device combination capable of sensing gestures and/or touches including a touch-sensitive surface. In addition, the display screen may include components, such as a video input component such as an optical sensor (for example, a camera or imaging technology), an audio input component such as a microphone, and a mechanical input component such as button or key selection sensors, a touch pad sensor, a touch-sensitive sensor, a motion sensor, and/or a pointing device such as a joystick, a touch pad, a touch screen, a fingerprint sensor, or a pad for an electronic stylus.

The server 102 may include a processing unit and a non-transitory machine-readable storage medium. The processing unit may include a processor with a computer-readable medium, such as a random access memory coupled to the processor. The server 102 may be executing algorithms or computer executable program instructions, which may be executed by a single processor or multiple processors in a distributed configuration. The server 102 may be configured to interact with one or more software modules of a same or a different type operating within the training system 100.

Non-limiting examples of the processor may include a microprocessor, an application specific integrated circuit, and a field programmable object array, among others. The server 102 is capable of executing various tasks. Non-limiting examples of the server 102 may include a desktop computer, a server computer, a laptop computer, a tablet computer, and the like. For ease of explanation, the FIG. 1 shows a single server computing device functioning as the server 102. However, some embodiments may include a plurality of server computing devices capable of performing various jobs described herein.

The server 102 may operate as a web server hosting a user-centric media streaming application accessible to the electronic device 110 via the virtual and augmented realty applications. The server 102 may execute software protocols configured to host the media streaming application website (e.g., Apache®, Microsoft IIS®), which may generate and serve various webpages of the media streaming website to the electronic device 110. The media streaming application website may be used to access digital content files (for example, a first digital content file associated with a first training program and a second digital content file associated with a second training program) stored in the database, such as the event database 104. The server 102 may use the configurator 106 to generate the digital content files and store the digital content files in the event database 104. The configurator 106 may define a set of parameters (for example, duration) and an objective (or a training goal) of the user. Each training program may be designed based on the set of parameters and the objective of the user. The training program may include a plurality of virtual interactive objects corresponding to a plurality of tasks representing a virtual environment.

The server 102 may be associated with the electronic device 110 via the network 112. The server 102 may receive a request from the media streaming application running on the electronic device 110. The request may include the training goal of the user. The request may include biometric information of the user. The server 102 may receive the request directly from the electronic device 110 when the user of the electronic device 110 may want to access the digital content file on the electronic device 110. The server 102 may receive the request of the electronic device 110 via the agent 108 when the user of the electronic device 110 may want to access the digital content file on the electronic device 110. The agent 108 may be directly or indirectly associated with the electronic device 110. In one instance, the agent 108 may be installed within the electronic device 110.

The server 102 may directly process the instructions to dynamically generate the virtual environment from the digital content file based on the goal and the profile of the user. The server 102 may process the request via the agent 108 to dynamically generate the virtual environment on the electronic device 110. The server 102 may cause the electronic device 110 to present the virtual environment via the agent 108, or the electronic device 110 may present the environment directly from the digital content file. In addition to graphical objects that represent items, scenery, background, text, or other virtual components, the digital content file may include tasks associated with the training program, which may be dynamically selected from a large set of tasks based at least on the goal and the profile of the user.

The server 102 from the agent 108 monitors the user in a background process while the user is performing the tasks associated with the training program using the electronic device 110 and/or the controller 114. The agent 108 collects data records associated with each movement of the user from the sensor 116, the cameras, and other monitoring devices, which may be associated with the electronic device 110 and the controller 114. The data records may include sensor data and camera data associated with the user, which may be processed to determine a current state of the user.

The server 102 from the agent 108 may capture and filter data records (for example, records indicating status of execution of a first task of a first training program selected based on a first training goal of a user) and identify patterns within the data records indicating an occurrence of an event. A first event may correspond to successful completion of one level of the first task. A second event may correspond to successful completion of a second level of the first task or completion of a second task.

Upon receiving data from the electronic device 110 via agent 108, the server 102 can dynamically determine a next action in the training program based on the occurrence of the events and the current state of the user. In one example, when the agent 108 determines an occurrence of a first event and a first state of the user, the agent 108 dynamically uses a new digital content file (for example, a second digital content file) and transitions to a new virtual environment on the graphical user interface of the electronic device 110. The second digital content file may include a second training program, including a plurality of second virtual interactive objects, which may be dynamically selected. The plurality of second virtual interactive objects correspond to a second task representing a second virtual environment. The second task may be selected based on the first training goal of the user. The second task and the first task may be different, but both the first task and the second task may be associated with same first goal of the user. In another example, when the agent 108 identifies a second event and a second state of the user, the agent 108 uses a new digital content file (for example, a third digital content file) and transitions to a new virtual environment on the graphical user interface of the electronic device 110. The third digital content file may include a plurality of third virtual interactive objects, which may be dynamically selected. The plurality of third virtual interactive objects correspond to a third task representing a third virtual environment. The third task may be selected based on the first goal of the user and the current state of the user. The third task and the first task may be different, however both the first task and the third task may be associated with same first goal of the user.

Before executing the agent 108 to generate a virtual environment, the server 102 trains the algorithms used by the agent 108 using a training dataset and various rules. The training dataset may include a relationship between the sample biometric information, the sample events, and the sample virtual interactive objects. Initially, the server 102 may normalize information associated with the sample biometric information, the sample events, and the sample virtual interactive objects using one or more normalization algorithms. The server 102 may remove noise from the information associated with the sample biometric information, the sample events, and the sample virtual interactive objects using one or more pre-processing algorithms. The server 102 may store normalized and pre-processed records of the sample biometric information, the sample events, the sample user states, and the sample virtual interactive objects in the training dataset, which may be further used in machine learning.

The server 102 may monitor and record performance of the agent 108. The server 102 may continuously update the rules and the relationship between all sample biometric information, all sample events, and all sample virtual interactive objects in the training dataset based on feedback data (for example, selected virtual interactive objects, occurrence of events, and user states based on biometric information) associated with past operations and performance of the agent 108.

The server 102 may continuously update the training dataset using the feedback data and new sample biometric information, new sample events, and new sample virtual interactive objects in the training dataset. The server 102 may periodically or continuously re-train the agent 108 based on the updated training dataset. For instance, the server 102 may use a back-propagation method to reconfigure the mathematical functions (e.g., weight and bias factors) and retrain the agent 108 to account for new information in the updated training dataset. The agent 108 may be iteratively trained each time the training dataset is updated. The server 102 may use a variety of methods to train and re-train the agent 108, such as, evolutionary algorithm methods, simulated annealing methods, expectation-maximization methods, and non-parametric methods.

The server 102 trains the agent 108 using machine-learning. The agent 108 dynamically selects virtual interactive objects from a digital content file corresponding to a task representing a virtual environment. Using feedback from a user's interactions, biometric information, and/or accomplishments in that virtual environment for a specific task, the server 102 uses machine learning to train the algorithms used by the agent 108 to dynamically select tasks and virtual interactive objects. For example, using machine learning, the agent 108 may be trained to offer more challenging tasks if even the harder tasks are being accomplished too easily. The results from the prior tasks is inputted back into the system to better predict how a user will react and interact to a particular virtual environment or task.

The machine-learning may include one or more statistical models, such as, weighted least square regression model, gradient boosting regression model, and gradient boosting classification model. In some embodiments, the machine-learning may include a neural network. The neural network may include an interconnected group of artificial neurons, which may be represented by sample biometric information, sample events, and sample virtual interactive objects. The machine-learning may represent a semi-supervised mathematical model, which may include mathematical functions describing a relationship between each neuron within the neural network using weight and bias factors. The machine-learning may include, but not limited to, a mathematical function describing how the neurons are divided into one or more layers.

In FIG. 1, the architecture is described using a server 102, agent 108, and electronic device 110. These components are intended to be illustrative, and any other configuration that has this functionality consistent with this disclosure may be utilized. For example, all functionality may be local to the electronic device 110. In another example, electronic device 110 may be a thin client and the processing can occur on server 102.

Figure 2:
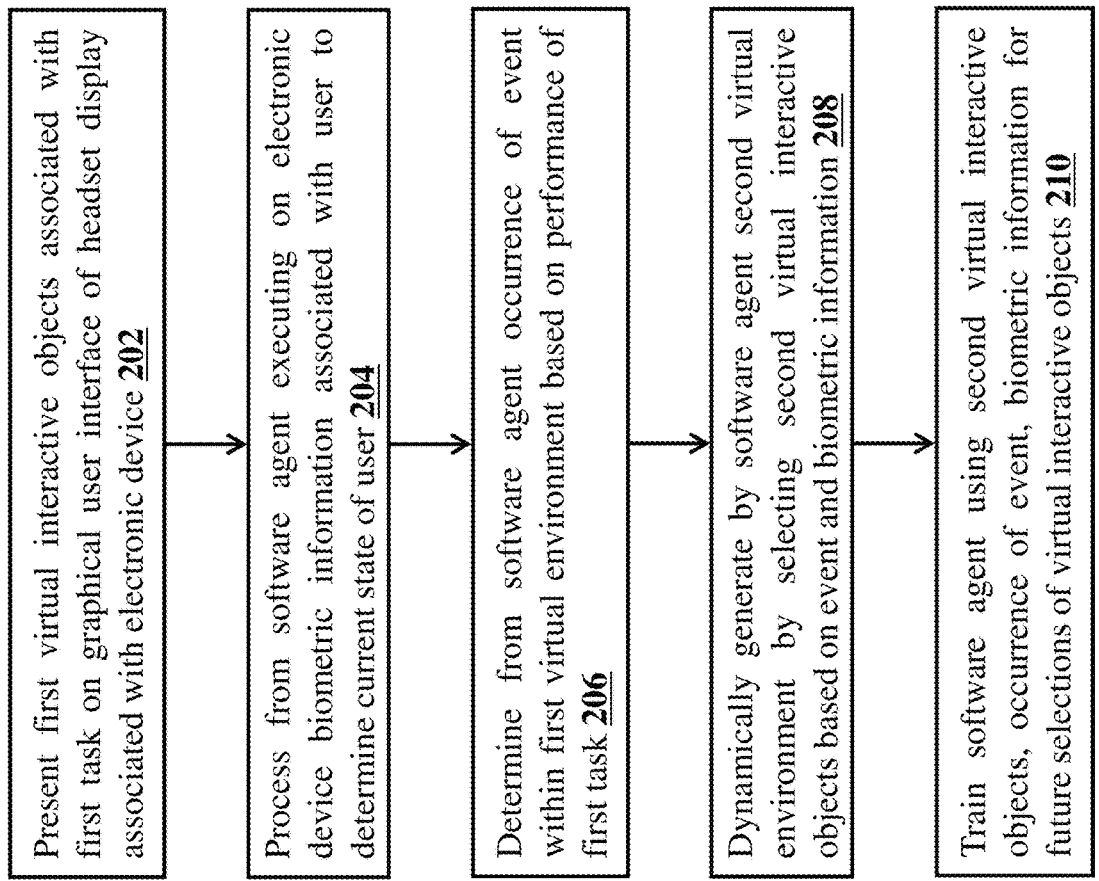
FIG. 2 shows execution of a method corresponding to operations of a computer-based training system, according to an embodiment.

FIG. 2 shows a flow diagram of an illustrative method for operations of a computer-based exercise training system, according to an embodiment. The method 200 shown in the FIG. 2 may include execution steps 202, 204, 206, 208, and 210. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 200 of the FIG. 2 is described as being executed by a server in this embodiment. The server executing one or more steps may be programmed to execute various other, unrelated essential features. The steps may also be executed by a plurality of server computing devices operating in a distributed computing environment.

In a first step 202, the server may receive a request from an electronic device operated by a user. The request may include biometric information of the user. The request may include a goal (for example, a training goal or task) of the user. In response to receiving the request, server determines which digital content file is appropriate for performing this task. The server may utilize a data record of the user, including information such as previously stored biometric information in making this determination. The server then instructs the agent to use the computer-readable instructions and data from the data content file to cause a virtual environment to be displayed in a augmented reality or virtual reality format on the graphical user interface on the headset display of the user. The virtual environment for performing this task (or goal) may be considered a first training program. The server may present a plurality of first virtual interactive objects from the data content file corresponding to a first task associated with the first training program. In addition to features offered by an augmented reality or virtual reality system, such as moving and looking around, the user may use a controller, which is in communication with the electronic device to execute the first task.

Upon initiation of the first training program, one or more sensors are activated to begin collecting biometric information of the user. In an alternative, the sensors can begin collecting biometric information of the user before initiating the first training program so that there is benchmark of a rest state before the task begins. The sensors may be associated with the electronic device, the controller, and/or one or more wearable devices used by the user.

In a next step 204, a software agent executing on the electronic device communicates with the sensors. When the user may execute the first task using the electronic device and/or the controller, the one or more sensors associated with various devices may capture sensor data associated with the user. The sensor data may include biometric information of the user. The software agent may collect the biometric information of the user from the one or more sensors. The software agent may process the biometric information to determine a current state of the user. The software agent may transmit the biometric information to the server. The server may process the biometric information associated with the user to determine the current state of the user. The current state of the user may be a current physiological state of the user. The current state of the user may be a current motivational state of the user.

The biometric information of the user may have a value, such as a numerical value. A threshold can be applied to the values, such that when the biometric information is above a threshold, below a threshold, or within a range, then the software agent determines a current state of the user. For example, when using a heart rate sensor, the software agent receives values representing the heart rate of the user. If the heart rate is below 100, the software agent may determine that the user is relaxed (e.g., a first state). If the heart rate is between 100 and 130, the software agent may determine that the user is stressed (e.g., a second state). If the heart rate is above 130, the software agent may determine that the user is very stressed (e.g. a third state).

The software agent may make another determination upon receiving additional biometric information, such as a determination of a new current state, optionally accounting for a previous state. For example, using the heart rate data, if the heart rate is now at 125 and was previously at 150, the software agent may determine that the user is in a tired state. If the heart rate is now at 80 and was previously at 110, the software agent may determine that the user is in a relaxed state. When performing a task at a first heart rate and completing at a second heart rate, the software agent can process the data to assess whether the user more easily accomplished the task or was stressed during that task. This analysis is used in the software agent to determine parameters of the next task, such as whether it should be only slightly more difficult, much more difficult, repeat a request for a certain skill, or seek to accomplish another skill, amongst other possible goals.

In a next step 206, the software agent may monitor and capture records associated with the performance of the first task performed by the user using the electronic device and/or the controller. The software agent may process the records to determine an occurrence of an event within the first virtual environment based on the performance of the first task being executed using the electronic device and/or the controller. A first event may occur when the user completes a first level of the first task. A second event may occur when the user completes a second level of the first task . When a particular event (for example, the first event) occurs, the software agent record and transmit information associated the occurrence of the first event to the server. The server receives the information associated the occurrence of the first event from the software agent.

In one example, a task may be a mission to locate a certain item in an augmented realty view. The headset display presents virtual items within a real world view that the user can use to collect clues, perform activities, and interact with. The software agent determines whether the user was able to locate the item to accomplish the task, determine the length of time of the task, determine the length of the time for each clue, activity, or other interaction, and collect data regarding other interactions, both real and virtual.

The software agent and/or the server combine the data from the task as well as the biometric information to dynamically determine what to present next to the user. Each user may perform differently during the first task in the first virtual environment, so more effective training will customize a second task for each user depending on their first task performance and biometric information. The software agent and/or server determines an appropriate second task and the digital content file that has the instructions and data for a second virtual environment specifically configured for that user. The second virtual environment can transition from the first virtual environment seamlessly as the software agent dynamically processes and instructs based on the user data.

In a next step 208, the server dynamically determines that a second task is appropriate based on the biometric information and the completed first task data showing completion of the event. So the server generates, using the software agent, a second virtual environment on the graphical user interface of the headset display associated with the electronic device. The software agent dynamically selects a set of second virtual interactive objects of a second digital content file representing the second virtual environment based on the occurrence of the received data, including the biometric information. The set of second virtual interactive objects corresponds to the second task and is dependent upon the occurrence of the received data, including the occurrence of the event, other first task information, and/or the value of the biometric information. The second task may be also be selected based on a particular training goal of that user.

In a next step 210, the server receives feedback data and trains the software agent using the feedback data (using machine learning), such as refining the algorithm that dynamically selects the set of second virtual interactive objects using the occurrence of the event and biometric information for future selections of virtual interactive objects.

The server from the software agent may dynamically generate a third virtual environment for a third task, based on the occurrence of another event and further biometric information of the user, on the graphical user interface of the headset display associated with the electronic device. The software agent dynamically selects a set of third virtual interactive objects of a third digital content file representing the third virtual environment based on the occurrence of the new event and the new value of the biometric information. The set of third virtual interactive objects correspond to the third task, which may be subsequent to the second task, and is dependent upon the occurrence of the new event and the new biometric information while user is performing the second task. The third task may be selected based on the training goal of the user, whether an initial goal or a revised goal.

In an example of the operation of an embodiment, a solider uses virtual reality for training purposes. The virtual reality may be useful for the solider to train for combat situations or other dangerous settings where the solider has to learn how to react in an appropriate manner. The soldier uses an electronic device that includes a virtual reality application to simulate a virtual reality battlefield simulation task. The task may include multiple scenarios. While the user is within a first scenario having first virtual interactive objects, an intelligent agent integrated within the electronic device communicates with sensors and cameras to determine a status of the task and a state of the solider. If the soldier has successfully completed a levels of the task within a predetermined time and the user shows particular physiological attributes, the intelligent agent present a second scenario having second virtual interactive objects on the electronic device. If the soldier does not complete the level of the task within the predetermined time or shows physiological attributes that do not satisfy a particular threshold (e.g., heart rate too high), the intelligent agent presents a third scenario having third virtual interactive objects on the electronic device that differ from the second scenario.

The application of the embodiments described herein is not intended to be limited to a particular military exercise training. These embodiments can apply to military simulation and virtual training for combat (e.g., medics, soldiers on battlefield, vehicle simulation, driving and repair, parachuting into hotspots, assembling a weapon, repairing a weapon), flight (e.g., flight simulation), maritime, boot camp, and other environments.

Commercial, non-military applications include, but are not limited to, gaming, education, healthcare, engineering, real estate, retail, and sports. Medicine is another example of a potential application of this technology to train medical professionals. The technology can also be used to diagnose or treat conditions, such as autism, ADD, anxiety, phobias, sleep disorders, pain management, OCD and others.

An example of another application is training of first line responders, including EMTs, paramedics, fire fighters, and bomb squads. Virtual environments are created containing different scenarios where they have to make fast decisions in life and death situations where there is not a lot of time. The users also get the hands-on experience in situations that might be too expensive or dangerous to create in the real world. The situations can be used again and again and can be changed depending on the participants' skill level.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
transmitting, by a server to a software agent associated with a software application executed at an electronic device, a first command for dynamically generating within the software application a plurality of first virtual interactive objects corresponding to a first task from a first digital content file on a graphical user interface representing a first virtual environment for a headset display associated with the electronic device;

receiving, by the server, from the software agent executing on the electronic device communicating with at least one sensor, biometric information associated with the user while the user is performing the first task;

determining, by the server, an occurrence of an event within the first virtual environment within the software application based upon an indication received from the software agent executing on the electronic device communicating with at least one controller of the occurrence of the event within the first virtual environment based on performance of the first task;

in response to the server determining the occurrence of the event within the first virtual environment within the software application and based on a value of the biometric information, transmitting, by the server, a second command to the software agent for dynamically generating within the software application a second virtual environment for the headset display and dynamically selecting a set of second virtual interactive objects of a second digital content file on the graphical user interface, the set of second virtual interactive objects corresponding to a second task subsequent to the first task and dependent upon the occurrence of the event and the value of the biometric information; and training, by the server, the software agent using the selected set of second virtual interactive objects, the occurrence of the event and biometric information for future selections of second virtual interactive objects.

2. The server-implemented method according to claim 1, wherein the at least one sensor is configured to record the biometric information associated with the user.

3. The server-implemented method according to claim 2, wherein the biometric information associated with the user comprises physiological data, motivational state data, heart rate data, and body temperature data.

4. The server-implemented method according to claim 2, wherein the at least one sensor is within a wearable device used by the user, and wherein the wearable device is a smart watch.

5. The server-implemented method according to claim 2, wherein the at least one sensor is within the at least one controller used by the user.

6. The server-implemented method according to claim 1, wherein the first task is selected based on a training goal of the user.

7. The server-implemented method according to claim 6, wherein the second task is selected based on the training goal of the user.

8. The server-implemented method according to claim 1, wherein the software agent is configured to process the biometric information associated with the user to determine a current state of the user.

9. The server-implemented method according to claim 1, further comprising transmitting, by the server, a command to the software agent for dynamically generating within the software application a third virtual environment and dynamically selecting a set of third virtual interactive objects of a third digital content file on the graphical user interface of the headset display associated with the electronic device in response to the occurrence of a second event within the second virtual environment and a second value of the biometric information, the selected set of third virtual interactive objects corresponding to a third task subsequent to the second task and dependent upon the occurrence of the second event and the second value of the biometric information.

10. The server-implemented method according to claim 9, wherein the third task is selected based on a training goal of the user.

11. A system comprising:

a non-transitory storage medium configured to store a plurality of computer program instructions; and a server electrically coupled to the non-transitory storage medium and configured to:

transmit to a software agent associated with a software application executed at electronic device, a first command for dynamically generating within the software application a plurality of first virtual interactive objects corresponding to a first task from a first digital content file on a graphical user interface representing a first virtual environment for a headset display associated with the electronic device;

receive from the software agent executing on the electronic device communicating with at least one sensor, biometric information associated with the user while the user is performing the first task;

determine an occurrence of an event within the first virtual environment within the software application based upon an indication received from the software agent executing on the electronic device communicating with at least one controller of an occurrence of an event within the first virtual environment based on performance of the first task;

in response to determining the occurrence of the event within the first virtual environment within the software application and based on a value of the biometric information, transmit a second command to the software agent to dynamically generate within the software application a second virtual environment for the headset display and dynamically select a set of second virtual interactive objects of a second digital content file on the graphical user interface, the set of second virtual interactive objects corresponding to a second task subsequent to the first task and dependent upon the occurrence of the event and the value of the biometric information; and train the software agent using the selected set of second virtual interactive objects, the occurrence of the event and biometric information for future selections of second virtual interactive objects.

12. The system according to claim 11, wherein the at least one sensor is configured to record the biometric information associated with the user.

13. The system according to claim 12, wherein the biometric information associated with the user comprises physiological data, motivational state data, heart rate data, and body temperature data.

14. The system according to claim 12, wherein the at least one sensor is within a wearable device used by the user, and wherein the wearable device is a smart watch.

15. The system according to claim 12, wherein the at least one sensor is within the at least one controller used by the user.

16. The system according to claim 11, wherein the first task is selected based on a training goal of the user.

17. The system according to claim 16, wherein the second task is selected based on the training goal of the user.

18. The system according to claim 11, wherein the software agent is configured to process the biometric information associated with the user to determine a current state of the user.

19. The system according to claim 11, wherein the server is further configured to transmit a command to the software agent for dynamically generating within the software application a third virtual environment by dynamically selecting a set of third virtual interactive objects of a third digital content file on the graphical user interface of the headset display associated with the electronic device in response to the occurrence of a second event within the second virtual environment and a second value of the biometric information, the selected set of third virtual interactive objects corresponding to a third task subsequent to the second task and dependent upon the occurrence of the second event and the second value of the biometric information.

20. The system according to claim 19, wherein the third task is selected based on a training goal of the user.

* * * * *